Aug. 1, 1944.          C. E. TACK          2,354,977
DISK BRAKE
Filed Dec. 31, 1941          4 Sheets-Sheet 2
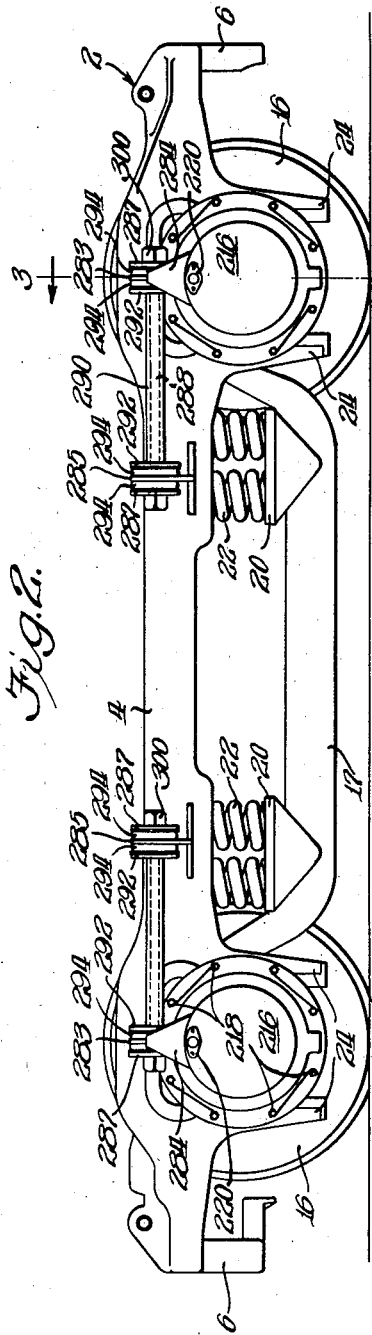
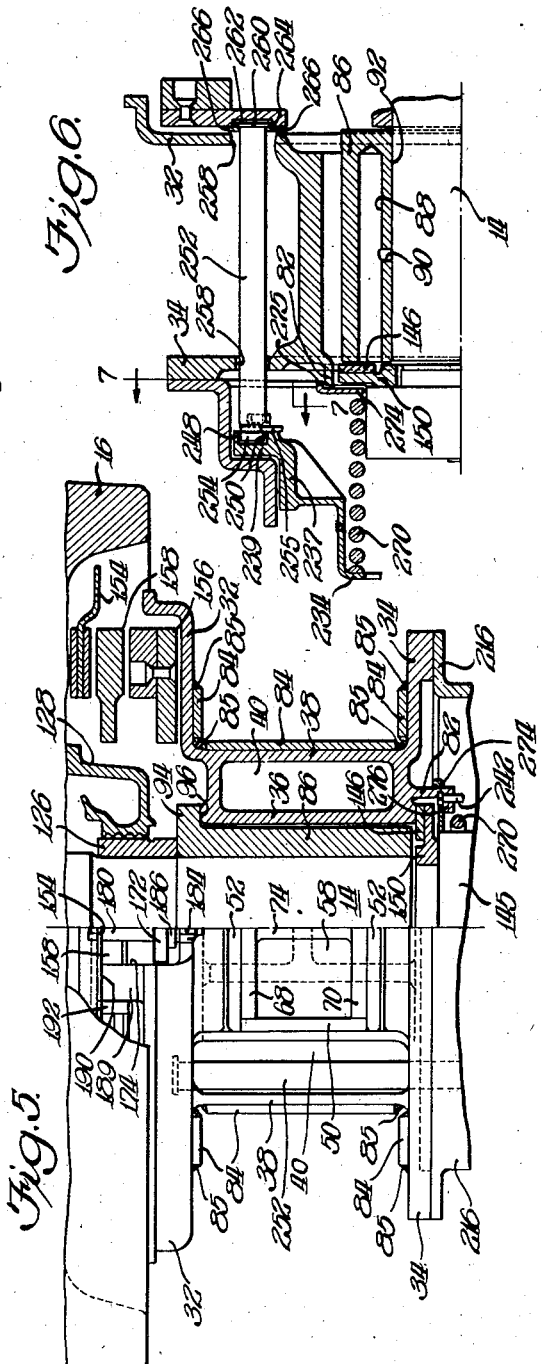
INVENTOR.
Carl E. Tack
BY
ATTORNEY:

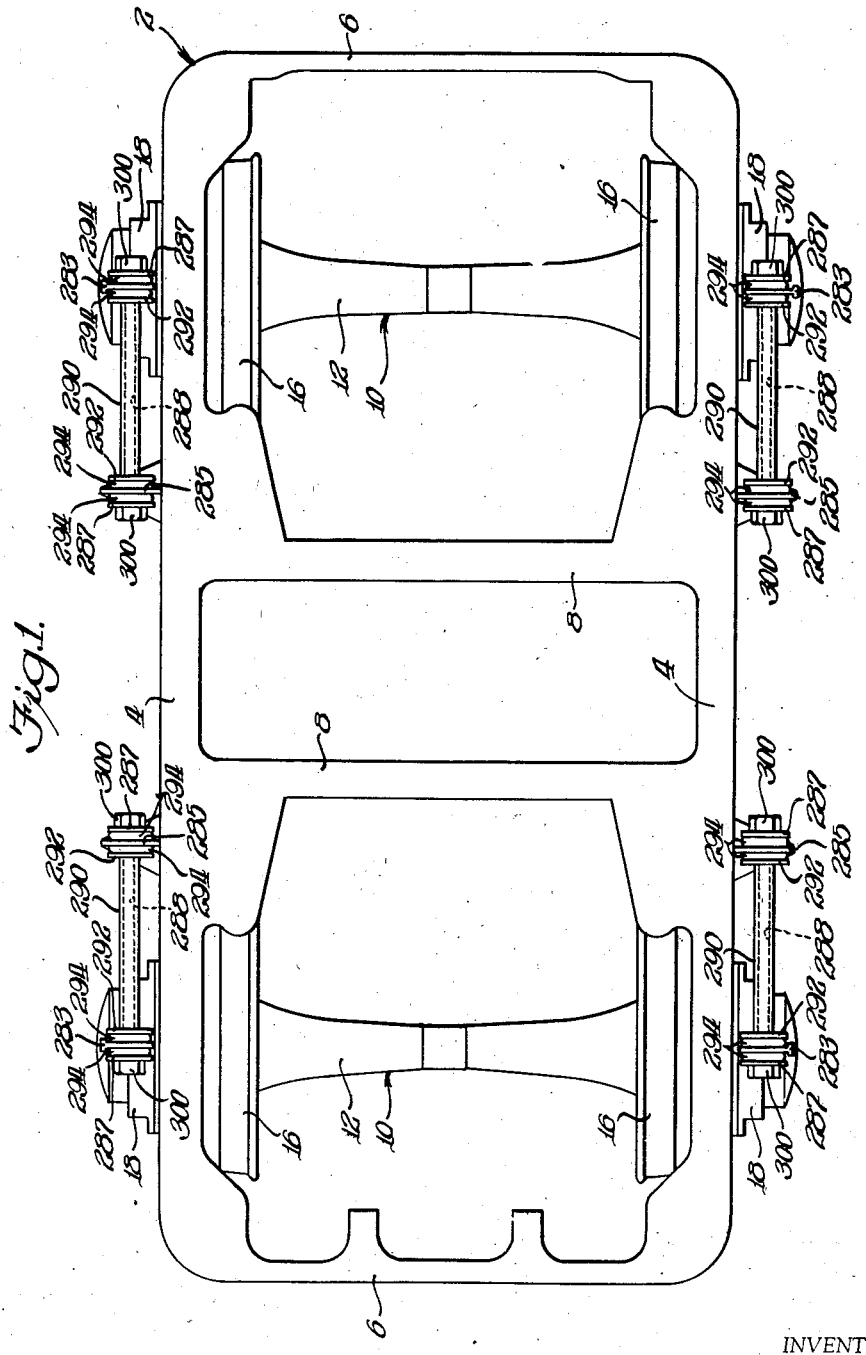

Aug. 1, 1944. C. E. TACK 2,354,977
DISK BRAKE
Filed Dec. 31, 1941 4 Sheets-Sheet 3
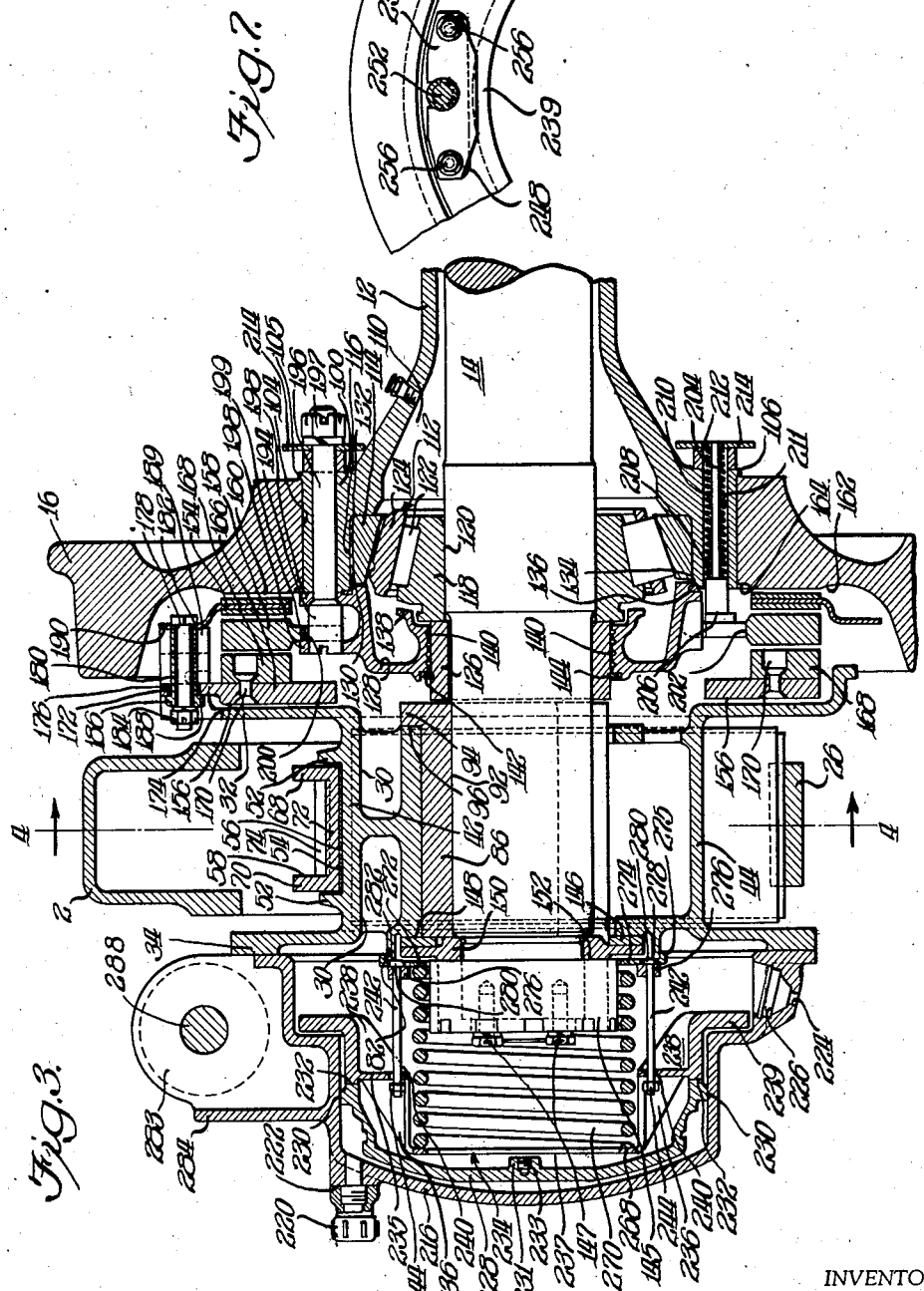
INVENTOR.
Carl E. Tack
BY
ATTORNEY.

Aug. 1, 1944.   C. E. TACK   2,354,977
DISK BRAKE
Filed Dec. 31, 1941   4 Sheets-Sheet 4

INVENTOR.
Carl E. Tack
BY
ATTORNEY.

Patented Aug. 1, 1944

2,354,977

UNITED STATES PATENT OFFICE 2,354,977

DISK BRAKE

Carl E. Tack, Chicago, Ill., assignor to American Steel Foundries, Chicago, Ill., a corporation of New Jersey Application December 31, 1941, Serial No. 425,077

21 Claims. (Cl. 188—153)

My invention relates to a brake arrangement for railway car trucks and more particularly to a disk brake arrangement in which interleaved rotors and stators are operable between outboard journal boxes and the wheels of supporting wheel and axle assemblies.

My invention contemplates such a disk brake arrangement wherein the operating means and the stators associated therewith may be supported from outboard the associated journal boxes and wherein the release means for said stators may also be supported from outboard said boxes.

An object of my invention is to effect the transmission of torque to the journal boxes associated with said wheel and axle assemblies, said transmission being accomplished by means of slots and lugs alternately arranged about inboard flanges formed on said boxes, said lugs cooperating with torque transmitting means on the associated inboard stators and said slots cooperating with means on the outboard stators.

My invention also contemplates a torque connection between the side frames and the journal boxes of a railway vehicle by means of rubber insulated torque rods.

Another object of my invention is to provide a single release spring for both the inboard and the outboard stators utilized in my novel brake arrangement, said stators being interengaged in such manner that the force of the release spring is transmitted from the outboard stators to the inboard stators.

In the drawings,

Figure 1 is a top plan view of a railway car truck embodying my novel arrangement.

Figure 2 is a side elevation of the structure shown in Figure 1.

Figure 3 is an enlarged fragmentary sectional view taken in the transverse vertical plane bisecting the wheel and axle assembly shown at the right in Figure 2 and my novel braking device applied thereto, substantially as indicated by the line 3—3 of Figure 2.

Figure 5 is a fragmentary top view of the structure shown in Figures 3 and 4, the left half thereof being a plan view with a portion of the wheel broken away in order more clearly to show the associated breaking device, and the right half thereof being a sectional view taken in the horizontal plane indicated by the line 5—5 of Figure 4.

Figure 6 is a further sectional view of the structure shown in Figures 3, 4, and 5, the section being taken in the diagonal plane indicated by the line 6—6 of Figure 4.

Figure 7 is a sectional view taken in the plane indicated by the line 7—7 of Figure 6 and showing the details of the means securing one of the actuating bolts utilized in my novel arrangement to the associated spring cap.

Figure 4:
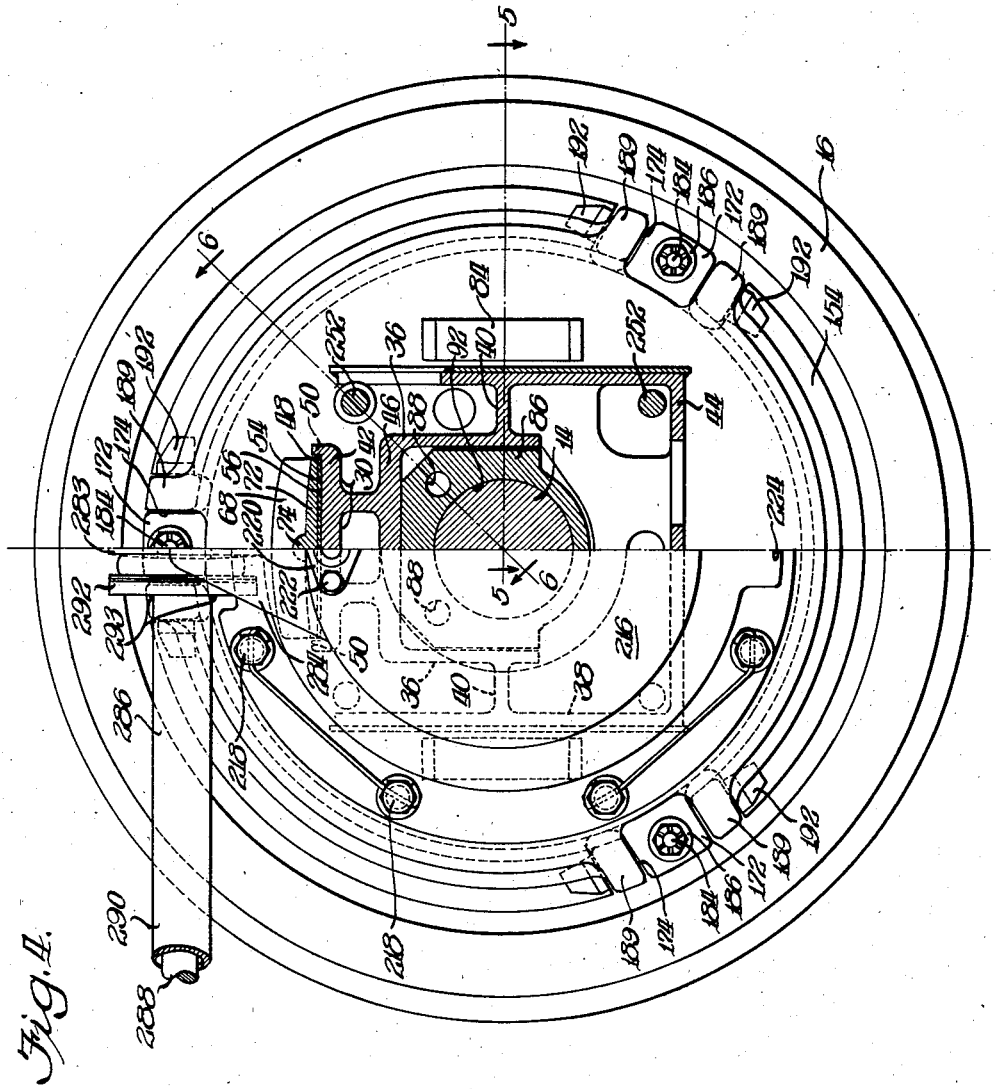
Figure 4 is a side view of the structure shown in Figure 3, taken from the left as seen in that figure, the left half thereof being a view in elevation and the right half thereof a sectional view taken in the vertical plane indicated by the line 4—4 of Figure 3.

In each of said figures certain details may be omitted where they are more clearly shown in other of said figures.

Describing my novel structure in detail, the truck frame generally designated 2 comprises spaced side rails 4, 4, end rails 6, 6, and spaced transoms 8, 8 providing a means of connection to a swing bolster (not shown) upon which may be supported in well known manner a car body (not shown). Extending between the side rails at each end of the truck is a wheel and axle assembly generally designated 10 and comprising, as best seen in Figure 3, an outer rotating axle 12, an inner nonrotating axle 14, and wheels 16, 16 fitted on said outer axle. Journal boxes generally designated 18, 18 are associated with the journal ends of the axles 14, 14 in a manner hereinafter more fully described, and mounted on said boxes at each side of the truck, also in a manner hereinafter more fully described, is an equalizer 17 supporting spring seats 20, 20 affording a support for coil springs 22, 22, the upper ends of which are seated against the associated side rail 4 in well known manner. At each end of each side rail 4 is formed a pair of pedestal jaws 24, 24 gripping the associated journal box in the usual manner, and a strap 26 (Figure 3) is secured to the lower extremities of said jaws in order to secure the journal box therebetween. Each journal box 18 is cored away as at 30, 30 and comprises the spaced inboard and outboard annular flanges 32 and 34, the spaced inner vertical transverse webs 36, 36, and the spaced outer vertical transverse webs 38, 38 joined to the inner webs 36, 36 by means of the horizontal webs 40, 40. Each journal box also comprises the top web 42, the bottom web 44, and the intermediate horizontal web 46, said top web 42 comprising a recess 48 in the top thereof defined by the vertical end flanges 50, 50 and the vertical inboard and outboard lateral flanges 52, 52. Positioned within said recess 48 is a pad 54 of linoleum or similar material and seated thereon as at 56 is the equalizer seat 58, said seat comprising inboard and outboard vertical flanges 68 and 70, a bottom web 72 comprising a crowned top surface, as may be best seen in Figure 4, and an arcuate lug 74 formed on said bottom web 72 and extending between said flanges 68 and 70 and integrally formed therewith, said seat providing positioning means for an end of the associated equalizer 17. The journal box 18 also comprises an outboard annular flange 82 horizontally disposed and serving a purpose hereinafter described, and wear plates 84, 84 are welded as at 85, 85 (Figure 5) to the inboard and outboard annular flanges 32 and 34 and to the outer vertical transverse webs 38, 38 said wear plates providing guiding surfaces for abutment with the associated pedestal jaws 24, 24 of the truck frame 2.

Positioned between the spaced inner vertical transverse webs 36, 36 and abutting the horizontal web 46 of the journal box is the bearer 86 of nonferrous metal, said bearer comprising the spaced lubricant cavities 88, 88 with openings 90, 90 therein, as best seen in Figure 6, in order to permit lubricant in said cavities to flow into the opening 92 in said bearer and thus to lubricate the journal end of the inner axle 14 received within said opening 92. It will be understood that under normal conditions the inner axle will not rotate save for some slight creeping movement and consequently lubricant therefor will be unnecessary. For this reason the lubricant contained in the cavities 88, 88 in the bearer may have a relatively high melting point so that said lubricant will not flow into contact with the inner axle unless because of some accident the inner axle commences to rotate within the bearer 86, thereby generating sufficient heat to melt said lubricant which may comprise some compound which, when heated, gives off a pungent odor thereby serving as a warning that the inner axle is abnormally rotating within the bearer 86. The bearer 86 also comprises an inboard flange 94 abutting the journal box as at 96 (Figure 3) and restraining said box against relative inboard movement with respect to said bearer.

Each wheel and axle assembly generally designated 10 comprises, as already indicated, an outer normally rotating axle 12, and said axle includes a hub portion 100 with a wheel 16 press-fitted thereon as at 104 and abutting an inboard annular flange 105 on said hub portion as at 106. Said assembly also comprises the inner normally nonrotating axle 14, and between said axles is a lubricant cavity 110, containing the roller bearing unit generally designated 112 and comprising an outer race 114 press-fitted within the hub 100 of the wheel as at 116, and an inner race 118 press-fitted upon the inner axle 14 as at 120. Between said races are the roller bearings 122, 122 spaced by the cage 124. The inner race is held in position by the collar 126 shrunk on the inner axle 14, and the outer race 114 is held in position by the closure plate 128 which abuts said outer race as at 130 and which comprises the annular shoulder 132 seated as at 134 within the hub portion 100 of the outer axle 12, said plate being secured by the bolts 196, 196 hereinafter described. Compressed between said hub and said closure plate is the gasket 136 serving to retain the lubricant within the cavity 110. The closure plate 128 also comprises the inwardly directed annular flange 138 and a series of annular grooves 140, 140 forming with the outer end of the inner race 118 and with the shrink collar 126 a labyrinthian passage preventing the escape of lubricant from the cavity 110. Adjacent the outboard end of the collar 126, a snap type baffle ring 142 is positioned as at 144 and also serves to prevent escape of lubricant from said cavity. The inner axle 14 extends through the opening 92 in the bearer 86 and outboard thereof, and on the outboard end of said axle, a lock nut 145 is threaded and secured as at 147, 147. An annular washer 146 of nonferrous metal abuts the outboard edge of the journal box as at 148, 148 and is secured by the washer 150 which is in turn secured as at 152 by said lock nut 145, said washers 146 and 150 serving not only to position the journal box 18 and the bearer 86 but also to retain lubricant within the cavities 88, 88 of the bearer, as best seen in Figure 6.

My novel braking means comprises the inboard and outboard stators 154 and 156, the rotor 158 interposed between said stators, and the annular braking surface 160 formed on the outboard face of the associated wheel 16 by the relieved portions 162 and 164. Each inboard stator 154 comprises briefly, a circular flexible steel disk having spaced pads of relatively hard metal fixed on opposite sides thereof, and each outboard stator 156 comprises a relatively thick flexible steel disk 166 with relatively hard braking metal 168 secured thereto as at 170 and a plurality of outwardly extending lugs 172, 172 formed about the circumference thereof. Each lug 172 is received within a slot 174 formed in the inboard annular flange 32 of the journal box and comprises an opening 176 therethrough as best seen in Figure 3. Aligned with said opening 176 is an opening 178 in the inboard stator, and a metal sleeve 180 extends through said openings 176 and 178 and is secured to the inboard stator as at 182 by the bolt and nut assembly 184. Each sleeve 180 is provided with an annular flange 186 against which the associated lug 172 on the outboard stator abuts as at 188 (Figure 3) in its released position.

Adjacent each side of and partially defining each slot 174 in the inboard flange of the journal box is an inwardly directed upstanding lug 189 integrally formed with said flange and against which the inboard stator 154 abuts as at 190 (Figure 5) in its released position. Formed on the inboard stator adjacent each lug 189 is an angular lug 192 serving to transmit torque from the inboard stator to the journal box through the adjacent lug 189 when said stator is in its applied position in engagement with the associated rotor and the surface 160 on the associated wheel as hereinafter described. Torque is transmitted by the outboard stator to the journal box by means of the abutment of each lug 172 with the edge of the associated slot 174 in the journal box and with the edge of the associated lug 189 partly defining said slot.

The rotor 158 may be supported from the elongated heads 194, 194 on the rotor supporting bolts 196, 196, said heads having bearing in aligned spaced annular lugs 198, 198 (Figure 3) on the closure plate. Spaced slots 200, 200 on the inner circumference of said rotor engage said heads for axial movement therealong. Alternating with said slots 200, 200 are larger spaced slots 202, 202 (Figure 3) affording convenient means for dismantling said rotor by rotating it after the bolts 196, 196 are withdrawn so that the slots 202, 202 are aligned with the lugs 198, 198 so that the rotor may be slipped thereover. Release means for the rotor 158 are afforded by the spaced release pins 204, 204 each having a T-shaped head 206 abridging a slot 202 in said rotor for abutment with the inner adjacent circumference of said rotor and extending inboardly through the hub 100 of the outer axle 12 for abutment as at 208 with the spring 210 extending through an opening 211 in said hub and seated at its opposite end as at 212 against the cap 214 secured in well known manner by the nuts 197, 197 threaded on the bolts 196, 196, said bolts extending through said cap and being alternately arranged with the release pins 204, 204.

The power means utilized in my novel brake arrangement includes the cylinder 216 secured to the outboard flange 34 of the journal box 18 by the bolt and nut assemblies 218 (Figure 4), said cylinder being provided with air pipe connecting means 220 secured as at 222 to said cylinder. The cylinder also comprises an opening 224 adjacent the bottom thereof with an air filter 226 therein to prevent passage therethrough of foreign material, said opening affording ingress and egress of air to and from the portion of the cylinder inboard the piston 228, said piston being of circular form and abutting the wall of the cylinder as at 230 (Figure 3). A packing cup (not shown) may be positioned between the outboard end of the piston and the cylinder, in the usual manner. On the inboard face of said piston and centrally thereof is formed a lug 231 reamed out and threaded as at 233 for the reception of a threaded hook which may be utilized to remove the piston from the cylinder in disassembly of the device. Abutting the inboard edge of the piston 228 as at 232 is an annular spring cap generally designated 234 comprising inboard and outboard annular plates 235 and 237 joined by the spaced integral T-shaped webs 236, 236. The inboard plate 235 is flanged as at 239 and is reinforced by the spaced webs 238, 238. The plate 237 comprises spaced openings 240, 240 therethrough for the reception of bolts 242, 242 with nuts 244, 244 threaded thereon, said bolts serving a purpose hereinafter described, and the flange 239 comprises spaced bosses 248, 248 (Figure 6) each being counter-bored as at 250 for the reception of the head 254 on the associated actuating bolt 252, said head being secured within the recess 250 by means of a slotted clip 255 secured to the flange 239 by nut and bolt assemblies 256, 256 (Figure 7). Each actuating bolt 252 extends inboardly through aligned openings 258, 258 in the inboard and outboard annular flanges 32 and 34 on the journal box 18 and comprises an inboard head 260 received within a recess 262 in the associated outboard stator and secured therein by a washer 264 welded to said stator as at 266, 266. Abutting the spring cap 234 as at 268 is the release spring 270, said spring encircling the lock nut 145 and abutting at its opposite end as at 272 the annular spring plate 274, said plate comprising the horizontal flange 275 encircling the end of the flange 82 on the journal box. The spring plate 274 has openings 278, 278 therethrough and extending through said openings are the bolts 242, 242 each comprising a head 280 abutting as at 282 the outboard end of the horizontal flange 82 on the journal box and being secured with respect to the spring plate 274 by the washers 276, 276 secured to said plate in any convenient manner. Thus it will be apparent that when the cylinder and the journal box are dismantled, the bolts 242, 242 retain the spring cap 234, the spring 270, and the spring plate 274 in assembled relationship so that they may be handled as a unit.

Integrally formed atop each cylinder 216 is the vertically disposed transverse rib 283 and the vertical reinforcing rib 284, said rib 283 affording means for connection to the torque arm generally designated 286 and connecting said cylinder with the associated truck frame. The torque arm 286 comprises a rod 288 enclosed in a tube or casing 290, as best seen in Figures 2 and 4, said casing having at opposite ends thereof annular plates or disks 292, 292 welded thereto as at 293, 293. The opposite ends of the rod 288 extend beyond said plates 292, 292 through aligned openings in the rib 283 and a similarly disposed vertical rib 285 secured to the truck frame and through annular washers 287, 287 and the resilient pads 294, 294 interposed between said ribs and the plates 292, 292 and the washers 287, 287. Nuts 300, 300 may be threaded on the opposite ends of each rod 288 and tightened to compress the resilient pads 294, 294.

In operation, each piston 228 urges the associated spring cap 234 in an inboard direction and the spring cap, by means of the actuating bolts 252, 252 moves the stators and the associated rotor axially into a pile against the braking surface 168 on the associated wheel, said stators and rotors thus being frictionally engaged with each other and with said surface.

Torque is transmitted from the inboard and outboard stators to the journal box as heretofore described and from the journal box to the truck frame by means of the torque arm 286.

On release of the power means, the release spring 270 urges the spring cap 234 in an outboard direction and the spring cap, by means of the bolts 252, 252, moves the outboard stator in an outboard direction until the lugs 172, 172 thereon abut the flanges 186, 186 on the associated sleeves 180, 180. The rotor is urged into release position as at 199 against the outboard lugs 198, 198 on the closure plate 128 by the bolts 204, 204 and the associated release springs 210, 210 in the manner heretofore described. The inboard stator is moved outboardly into release position against the lugs 174, 174 on the inboard flange 32 of the journal box by means of the force applied to the sleeves 180, 180 by the abutment of the lugs 172, 172 on the outboard stator with the flanges 186, 186 on said sleeves, said outboard stator being urged in an outboard direction by the release spring 270 as heretofore described.

Thus it will be seen that I have provided a disk brake in which both the rotatable and the nonrotatable disks are supported inboard the journal box of the associated wheel and axle assembly and are actuated by power means supported outboard said box, both of said nonrotatable disks being released by a single release spring supported outboard said box and said nonrotatable disks having alternately arranged torque transmitting means cooperating with slots and lugs alternately arranged in and on said journal box.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a frame member, spaced wheel and axle assemblies each comprising an outer rotating axle, wheels fitted thereon, and an inner nonrotating axle having journal ends, journal boxes associated with said ends, each of said boxes comprising inboard and outboard annular flanges having a plurality of aligned openings therethrough, equalizers mounted on the boxes at respective sides of the truck and affording a resilient support for said frame member, and braking means comprising a cylinder secured to the outboard annular flange on each journal box and having a piston therein, a release spring reacting against said piston and a portion of said box, and a plurality of interleaved stators and rotors associated with each wheel, said stators being afforded an operative connection to said piston, said connection comprising a plurality of pins extending through respective openings and secured at opposite ends thereof to said piston and to one of said stators, a connection between said stator and the other of said stators, and stop means on said box limiting outboard movement of said other stator upon release thereof.

2. In a railway car truck, a frame member, spaced supporting wheel and axle assemblies each comprising an outer rotating axle, wheels fitted thereon, and an inner nonrotating axle having journal ends, journal boxes associated with said ends, equalizers mounted on the boxes at respective sides of the truck and affording a resilient support for said frame member, and braking means comprising power means secured to the outboard face of each box, stators and a rotor supported between said box and the associated wheel, and torque transmitting means comprising an inboard annular flange on said box having a plurality of spaced slots about the circumference thereof, an inboardly directed lug on said flange at each side of and partially defining each slot, means on one of said stators cooperating with each of said slots, and spaced means on the other of said stators at opposite sides of each slot and cooperating with the associated lugs to transmit torque to said journal box.

3. In a railway car truck, a frame member, spaced supporting wheel and axle assemblies each comprising an outer rotating axle, wheels fitted thereon, an inner nonrotating axle having journal ends, journal boxes associated with said ends, equalizers mounted on the boxes at respective sides of the truck and affording a resilient support for said frame member, power means secured to the outboard face of each box, stators and a rotor supported respectively from said box and from the associated wheel, and torque transmitting means comprising an inboard annular flange on said box having a plurality of spaced slots about the circumference thereof, a lug on said flange extending inboardly at each side of each slot, means on the outboard stator received within said slots, and spaced means on the outboard face of the other of said stators at opposite sides of each slot and cooperating with the associated lugs to transmit torque to said journal box, and a torque connection between said box and said frame member.

4. In a railway car truck, a frame member, spaced wheel and axle assemblies each comprising an outer rotating axle, an inner nonrotating axle having journal ends and wheels fitted on said outer axle, journal boxes associated with said ends, equalizers mounted on the boxes at respective sides of the truck and affording a resilient support for said frame member, and braking means comprising a cylinder secured to the outboard face of each journal box, a piston therein, interleaved rotors and stators, said rotors being supported from said wheel, rigid means secured to said piston and the outboard of said stators, and a connection between said stators comprising a pin slidably interlocked with said outboard stator and fixed to the adjacent stator, and release means for said outboard and adjacent stators comprising resilient means within said cylinder and engaged with said journal box at one end thereof and with said piston at the other end thereof.

5. In a brake arrangement, a wheel and axle assembly, a journal box associated therewith, a rotor driven by said assembly, stators at opposite sides of said rotor, power means for urging said rotor and stators inboardly to braking engagement against a wheel of said assembly, a release spring outboard said box, members connected to said spring and secured to the outboard of said stators for transmitting thereto reaction of said spring, and means connected between said stators for transmitting reaction of said spring to the inboard thereof.

6. In a brake arrangement for a railway car truck, a frame member comprising journal openings, spaced supporting wheel and axle assemblies each comprising an outer rotating axle with wheels fitted thereon and an inner nonrotating axle having journal ends, journal means associated with said ends and received within said openings, rotatable disks secured to said wheels, nonrotatable disks supported from said journal means, power means associated with said last-mentioned disks, and release means supported outboard said journal means and associated with said last-mentioned disks, said release means comprising a spring connected to one of said nonrotatable disks and means for transmitting reaction of said spring from said last-mentioned disk to the other of said nonrotatable disks.

7. In a brake arrangement, a wheel and axle assembly, a journal box associated therewith, a rotor driven by said assembly, stators at opposite sides of said rotor, power means for urging said rotor and stators inboardly to braking engagement against a wheel of said assembly, a release spring outboard said box, members connected to said spring and secured to the outboard of said stators for transmitting thereto reaction of said spring, means connected between said stators for transmitting reaction of said spring to the inboard thereof, and stop means limiting outboard movement of said inboard stator upon release thereof.

8. In a railway car truck, a frame member, spaced wheel and axle assemblies each comprising an outer rotating axle, wheels fitted thereon, and an inner nonrotating axle having journal ends, journal boxes associated with said ends, equalizers at each side of the truck mounted on respective boxes and affording a resilient support for said frame member, and braking means comprising a cylinder secured to the outboard face of each journal box and having a piston therein, a release spring reacting against said piston and an adjacent portion of said box, and a plurality of interleaved stators and rotors, the outboard of said stators being interlocked against relative inboard or outboard movement with respect to said piston, and the other of said stators being slidably interlocked with said first-mentioned stator, and stop means on the box limiting outboard movement of said other stator upon release thereof.

9. In a brake arrangement for a wheel and axle assembly, an outer rotating axle, an inner nonrotating axle having a journal end, a journal box associated therewith, a wheel fitted on said outer axle, power means supported outboard said journal means, stators operatively connected to said power means, a rotor supported from said wheel, and torque transmitting means comprising an inboard annular flange on said box comprising alternately arranged slots and lugs about the circumference thereof, torque means on one of said stators cooperating with said lugs, and torque means on the other of said stators cooperating with said slots, a release spring outboard said box and connected to the last-mentioned stator, and an interlocking connection between said stators, said spring being the sole release means for both of said stators.

10. In a railway car truck, a frame member, spaced wheel and axle assemblies each comprising an outer rotating axle, wheels fitted thereon, and an inner nonrotating axle having journal ends, journal boxes associated with said ends, equalizers mounted on the boxes at respective sides of the truck and affording a resilient support for said frame member, and braking means comprising power means secured to the outboard face of each box, stators and a rotor supported between said box and the associated wheel, means fixed to the inboard stator and slidably interlocked with the outboard stator, a single release spring connected to the outboard stator and constituting the sole release means for both of said stators, a plurality of release springs associated with said rotor, and stop means on the box limiting movement of the inboard stator in an outboard direction upon release thereof.

11. In a brake arrangement for a railway car truck, a frame member comprising journal openings, spaced supporting wheel and axle assemblies each comprising an outer rotating axle with wheels fitted thereon and an inner nonrotating axle having journal ends, journal means associated with said ends and received within said openings, rotatable disks secured to said wheels, nonrotatable disks supported from said journal means, power means associated with said last-mentioned disks, and resilient release means supported outboard said journal means and operatively connected to said last-mentioned disks, said operative connection including members connected to said release means and fixed to the outboard of said nonrotatable disks, pins slidably interlocked with said outboard disk and fixed to the inboard nonrotatable disk, and stop means limiting outboard movement of said inboard disk upon release thereof.

12. In a brake arrangement for a wheel and axle assembly, an outer axle, a wheel fitted thereon, an inner axle comprising a journal end, journal means associated with said end, rotatable and nonrotatable brake elements supported respectively from said wheel and from said journal means, operating means associated with said nonrotating elements, and release means comprising a plurality of release springs associated with certain of said elements, and a single release spring operatively connected to other of said elements, said operative connection comprising means connecting said spring to the outboard nonrotating element and means interconnecting said nonrotating elements for transmitting reaction of said spring to the inboard thereof.

13. In a brake arrangement for a wheel and axle assembly, an outer rotating axle, wheels fitted thereon, an inner nonrotating axle having a journal end, journal means associated therewith, a cylinder supported outboard said journal means and having a piston therein, a release spring positioned between said piston and said journal box, stators operatively connected to said piston, and a rotor supported from said wheel for frictional engagement with said stators, said operative connection comprising rigid means connected to said spring and secured to the outboard of said stators and means interconnecting said stators.

14. In a railway car truck having a frame, a journal box, a wheel and axle assembly comprising a wheel and an axle supported in said box, a flange on the inboard side of said box, slots in said flange, a pair of inboardly extending torque members on said flange at opposite sides of each slot, an outboard stator having torque lugs extending into said slots, an inboard stator having spaced members at opposite sides of each pair of said first-mentioned members for transmission of torque thereto, a rotor driven by said assembly between said stators, pins slidably interlocked with said lugs and fixed to said inboard stator, a power cylinder device including a piston on the outboard side of said box, said device being adapted to urge said stators and said rotor into braking engagement against said wheel, a release spring seated at opposite ends thereof against means on said piston and said box, and actuating members interlocked with said piston and said outboard stator.

15. In a railway car truck having a frame, a journal box, a wheel and axle assembly comprising a wheel and an axle supported in said box, a flange on the inboard side of said box, slots in said flange, a pair of inboardly extending torque members on said flange at opposite sides of each slot, an outboard stator having torque lugs extending into said slots, an inboard stator having spaced members at opposite sides of each pair of said first-mentioned members for transmission of torque thereto, a rotor driven by said assembly between said stators, pins slidably interlocked with said lugs and fixed to said inboard stator, a power cylinder device including a piston on the outboard side of said box, said device being adapted to urge said stators and said rotor into braking engagement against said wheel, a release spring seated at opposite ends thereof against means on said piston and said box, and actuating members interlocked with said piston and said outboard stator, said first-mentioned members affording stop means for said inboard stator limiting outboard movement thereof during release thereof.

16. In a brake arrangement for a wheel and axle assembly, an outer axle, a wheel fitted thereon, an inner axle comprising a journal end, journal means associated with said end, rotors supported from said wheel, power means supported outboard said journal means, a pair of stators operatively connected to said power means, and resilient release means operatively connected to both of said stators, said release means being supported outboard said journal means, said last-mentioned operative connection comprising spaced rigid members connected to said release means and secured to the outboard of said stators and spaced rigid members fixed to the inboard of said stators and slidably interlocked with the outboard thereof.

17. In a brake arrangement for a wheel and axle assembly, an outer axle, a wheel fitted thereon, an inner axle comprising a journal end, journal means associated therewith, stators and rotors supported respectively from said means and from said wheel, operating means associated with said stators, and release means comprising resilient means connected to the outboard of said stators, a connection between said stators for transmitting reaction of said resilient means to the inboard thereof, and stop means limiting outboard movement of the inboard stator upon release thereof.

18. In a railway car truck, a truck frame, a wheel and axle assembly comprising a wheel mounted on an axle, a journal box associated with said assembly, an equalizer supported on said journal box and affording a resilient support for said frame, and braking means comprising a rotor driven by said assembly, spaced stators at opposite sides of said rotor, support means for said stators comprising an inboard flange on a side of said box, slots in said flange, inboardly extending torque transmitting members on said flange at opposite sides of each slot and partially defining the same, lugs on the outboard stator received within respective slots for support of said stator and affording transmission of torque to said flange, spaced members on the outboard side of the other stator at opposite sides of each slot and cooperating with the associated of the first-mentioned members for transmitting torque thereto, and a power cylinder device mounted on the outboard face of said box and operatively associated with said outboard stator for urging said stators and rotor into breaking engagement against said wheel.

19. In a railway car truck, a truck frame, a wheel and axle assembly comprising a wheel mounted on an axle, a journal box associated with said assembly, an equalizer supported on said journal box and affording a resilient support for said frame, and braking means comprising a rotor driven by said assembly, spaced stators at opposite sides of said rotor, support means for said stators comprising an inboard flange on a side of said box, slots in said flange, torque transmitting members on said flange at opposite sides of each slot, lugs on the outboard stator received within respective slots for support of said stator and affording transmission of torque to said flange, spaced members on the outboard side of the other stator at opposite sides of each slot and cooperating with the associated of the first-mentioned members for transmitting torque thereto, and power means for urging said stators and rotor into braking engagement against said wheel.

20. In a railway car truck, a truck frame, a wheel and axle assembly comprising a wheel mounted on an axle, a journal box associated with said assembly, an equalizer supported on said journal box and affording a resilient support for said frame, and braking means comprising a rotor driven by said assembly, spaced stators at opposite sides of said rotor, support means for said stators comprising an inboard flange on a side of said box, slots in said flange, torque transmitting members on said flange at opposite sides of each slot, lugs on the outboard stator received within respective slots for support of said stator and affording transmission of torque to said flange, spaced members on the outboard side of the other stator at opposite sides of each slot and cooperating with the associated of the first-mentioned members for transmitting torque thereto, power means for urging said stator and rotor into braking engagement against said wheel, and release means for said braking means comprising a spring reacting against the outboard side of said box and against said outboard stator, and a pin slidably interlocked with each of said lugs and fixed to an adjacent portion of said other stator for transmitting thereto reaction of said spring.

21. In a brake arrangement, a wheel and axle assembly including a wheel, a journal box associated with said assembly outboard said wheel, a stator supported between said box and said wheel, a rotor driven by said assembly adjacent said stator, power means for urging said rotor and stator into frictional engagement, a release spring mounted on the outboard side of said box, and means connecting said spring to said stator for release thereof.

CARL E. TACK.